(12) United States Patent
Cho et al.

(10) Patent No.: US 11,438,552 B2
(45) Date of Patent: Sep. 6, 2022

(54) DEVICE AND METHOD FOR CONTROLLING OSD PROTOCOL

(71) Applicant: HANWHA TECHWIN CO., LTD., Seongnam-si (KR)

(72) Inventors: Sung Bong Cho, Changwon-si (KR); Raman Sujith, Changwon-si (KR); Rao Aravapalli Venkateswara, Changwon-si (KR); Mathivanan Yogavanan, Changwon-si (KR); Ramgopal Anumolu Tarak, Changwon-si (KR)

(73) Assignee: HANWHA TECHWIN CO., LTD., Seongnam-si (KR)

(*) Notice: Subject to any disclaimer, the term of this patent is extended or adjusted under 35 U.S.C. 154(b) by 253 days.

(21) Appl. No.: 15/606,144

(22) Filed: May 26, 2017

(65) Prior Publication Data
US 2017/0345268 A1 Nov. 30, 2017

Related U.S. Application Data

(60) Provisional application No. 62/342,319, filed on May 27, 2016.

(30) Foreign Application Priority Data

Dec. 22, 2016 (KR) ........................ 10-2016-0176844

(51) Int. Cl.
*H04N 5/907* (2006.01)
*H04N 7/18* (2006.01)
(Continued)

(52) U.S. Cl.
CPC ....... *H04N 7/183* (2013.01); *G08B 13/19673* (2013.01); *H04N 5/765* (2013.01);
(Continued)

(58) Field of Classification Search
CPC ........ G08B 13/19676; G08B 13/19682; G08B 13/19656; G08B 13/19673;
(Continued)

(56) References Cited

U.S. PATENT DOCUMENTS 6,328,207 B1* 12/2001 Gregoire ................ G06Q 20/02
235/379
2002/0171670 A1* 11/2002 Clernock ........... H04N 21/4314
345/629

(Continued)

FOREIGN PATENT DOCUMENTS

CN 103581624 A 2/2014
CN 203537510 U 4/2014
(Continued)

OTHER PUBLICATIONS

Communication dated Sep. 28, 2017, issued by the European Patent Office in counterpart European Patent Application No. 17173064.1.

*Primary Examiner* — Helen Shibru
(74) *Attorney, Agent, or Firm* — Sughrue Mion, PLLC

(57) ABSTRACT

A method of controlling an on-screen display (OSD) protocol in a device includes: receiving analysis data of a video image from an apparatus capable of at least one of wired and wireless communication; displaying the video image and analysis data of the video image on a display of the device; determining whether to record the analysis data of the video image in a persistent storage device to be retained after the device reboots or in a temporary storage device to be erased after the device reboots; and storing the analysis data of the video image in one of the persistent storage device and the temporary storage device according to the determination.

11 Claims, 11 Drawing Sheets

(51) Int. Cl.
  *G08B 13/196* (2006.01)
  *H04N 5/765* (2006.01)
  *H04N 5/781* (2006.01)
  *H04N 5/92* (2006.01)
(52) U.S. Cl.
  CPC ............. *H04N 5/781* (2013.01); *H04N 5/907* (2013.01); *H04N 5/9206* (2013.01)
(58) Field of Classification Search
  CPC . G06F 3/04842; G06F 3/04845; H04N 7/183; H04N 5/907; H04N 5/9206; H04N 5/765; H04N 5/781; G06K 9/00778; G11B 27/34
  USPC ........................................................ 386/230
  See application file for complete search history.

(56) References Cited

U.S. PATENT DOCUMENTS

| | | | | |
|---|---|---|---|---|
| 2004/0084521 A1* | 5/2004 | Nagayoshi | ............. | G07D 11/20 235/379 |
| 2004/0103233 A1* | 5/2004 | Shinkai | ................ | G11B 27/031 710/260 |
| 2004/0117819 A1* | 6/2004 | Yu | ...................... | H04N 21/4316 725/32 |
| 2007/0013776 A1* | 1/2007 | Venetianer | ............. | H04N 7/181 348/143 |
| 2007/0274703 A1* | 11/2007 | Matsuda | .......... | H04N 5/232945 396/264 |
| 2008/0097907 A1* | 4/2008 | Till | ........ | G07F 19/20 705/45 |
| 2009/0077039 A1* | 3/2009 | Narahara | ............... | G06F 3/0236 |
| 2011/0010631 A1* | 1/2011 | Rothschild | .......... | G06F 16/5838 715/733 |
| 2012/0054617 A1* | 3/2012 | Bachman | ............. | G11B 27/034 715/723 |
| 2014/0074977 A1* | 3/2014 | Niida | ..................... | H04N 5/772 709/217 |
| 2014/0111688 A1* | 4/2014 | Suvorov | ........... | H04N 21/4318 348/500 |
| 2016/0155465 A1* | 6/2016 | Park | ..................... | G11B 20/005 386/241 |
| 2016/0277652 A1 | 9/2016 | Mori | | |
| 2017/0091428 A1* | 3/2017 | Johnson | ................. | G06F 21/10 |

FOREIGN PATENT DOCUMENTS

GB  2415564 A  12/2005
KR  101447356 B1  10/2014
WO  2015/056379 A1  4/2015

* cited by examiner

DEVICE AND METHOD FOR CONTROLLING OSD PROTOCOL

CROSS-REFERENCE TO THE RELATED APPLICATIONS

This application claims priority from Korean Patent Application No. 10-2016-0176844, filed on Dec. 22, 2016, in the Korean Intellectual Property Office, and Provisional U.S. Patent Application No. 62/342,319, filed on May 27, 2016, in the U.S. Patent and Trademark Office, the disclosures of which are incorporated herein in their entirety by reference.

BACKGROUND

1. Field

One or more exemplary embodiments relate to a device and method for controlling an on-screen display (OSD) protocol, and more particularly, to a method of providing a function of temporarily storing an OSD protocol in addition to a function of persistently storing the same.

2. Description of the Related Art

An on-screen display (OSD) function enables a user to directly optimize a display by controlling a menu displayed on the display. These days, OSD functions are widely used to adjust basic settings of digital devices.

In a security system using network cameras or video management software (VMS), OSD data used for an image is recorded on a storage device capable of storing data persistently. According to the related art, there is provided an OSD setting protocol for storing text strings or logo images whose format or content is stored once entered. However, as this OSD protocol has recently been used in various ways, for example, for displaying an image showing characteristics of a person recognized as a result of vehicle number recognition, a storage device is repeatedly accessed to store an image or text that continuously changes in real time. In particular, in the case of a point of sale (PoS) system, a vehicle number recognition result, a recognized person's name, or an overlaid image displayed in a specific area of a video image, the image is temporarily displayed and disappears after a certain amount of time passes.

Unlike a device such as hard disk drives (HDDs) capable of accessing data repeatedly, a storage device such as NAND flash memory may be accessed a limited number of times. Accordingly, when NAND flash memory is accessed more than a certain number of times to write OSD data, the NAND flash memory may become defective and may no longer be able to store data or may even lose stored data.

SUMMARY

One or more exemplary embodiments include a device for controlling an on-screen display (OSD) protocol.

One or more exemplary embodiments include a method of selectively classifying data having high variability as temporary OSD data and data having low volatility as persistent OSD data, and storing respective data in different storage devices.

One or more exemplary embodiments include a method of managing OSD data varying in real time, by which OSD data may be used in financial institutions or at points of sale (PoS).

One or more exemplary embodiments include a method of managing OSD data varying in real time, by which Internet of things (IoT) data may be used.

One or more exemplary embodiments include a method of managing OSD data varying in real time, by which the number of persons may be detected and managed by network cameras or security cameras.

Additional aspects will be set forth in part in the description which follows and, in part, will be apparent from the description, or may be learned by practice of the presented embodiments.

According to an aspect of an exemplary embodiment, a method of controlling an on-screen display (OSD) protocol in a device may include receiving analysis data of a video image from an apparatus capable of at least one of wired and wireless communication; displaying the video image and the analysis data of the video on a display of the device; determining whether to record the analysis data of the video image in a persistent storage device to be retained after the device reboots or in a temporary storage device to be erased after the device reboots; and storing the analysis data of the video image in one of the persistent storage device and the temporary storage device according to the determination.

The temporary storage device may include random access memory (RAM).

The persistent storage device may include at least one of a flash memory, a hard disk drive, and NAND memory.

The analysis data of the video image may include at least one of data about faces recognized in the video image, data about a number of persons counted in the video image, information about a vehicle number recognized in the video image, information about the vehicle in the video image; information about a location, a date, and a time of capturing the video image, information about one of a credit card and a note in the video image captured at a point of sale (PoS), billing information, and IoT data of an object.

The displaying the video image and the analysis data may include one of displaying the analysis data overlaid on the video image, and displaying the analysis data separately from the video image.

When the analysis data is displayed overlaid on the video image, a user may be provided with an interface to select a position of the displayed analysis data with respect to the video image.

When at least one portion of the analysis data is displayed overlaid on the video image, a user may be provided with an interface to select a position of each of the at least one portion of the analysis data with respect to the video image.

When at least one portion of the analysis data is displayed overlaid on the video image, a first portion of the analysis data that is recorded in the persistent storage device may be displayed at a predetermined position, and a second portion of the analysis data that is recorded in the temporary storage device may be displayed at a position selected by a user by using an interface to select the position of the second portion of the analysis data with respect to the video image.

The displaying the video image and the analysis data may include displaying the analysis data as one of an image and text.

According to an aspect of an exemplary embodiment, a method of controlling an on-screen display (OSD) protocol in a device may include displaying a video image and analysis data of the video image on a display of the device that follows an open network video interface (ONVIF) standard; and storing the analysis data of the video image in a random access memory (RAM).

The method may further include, in response to the analysis data of the video image relating to a number of persons counted in the video image, transmitting an alarm message when the number of persons counted in the video image exceeds a threshold value.

The analysis data of the video image may be received from an external apparatus capable of one of wired and wireless communication.

According to an aspect of an exemplary embodiment, a device for controlling an on-screen display (OSD) protocol may include a receiver configured to receive analysis data of a video image from an apparatus capable of one of wired and wireless communication; an OSD display configured to display the video image and the analysis data of the video image; and a controller configured to store the analysis data of the video image in a temporary storage medium to be erased after the device reboots, in response to a value of a Boolean element added to a parameter format of an open network video interface forum (ONVIF) protocol implemented by the device being false.

The controller may be further configured to, in response to the value of the Boolean element being true, store the analysis data of the video image in a persistent storage medium to retain the analysis data of the video image after the device reboots.

BRIEF DESCRIPTION OF THE DRAWINGS

The above and/or other aspects will become apparent and more readily appreciated from the following description of various exemplary embodiments, taken in conjunction with the accompanying drawings in which.

DETAILED DESCRIPTION

Figure 1:
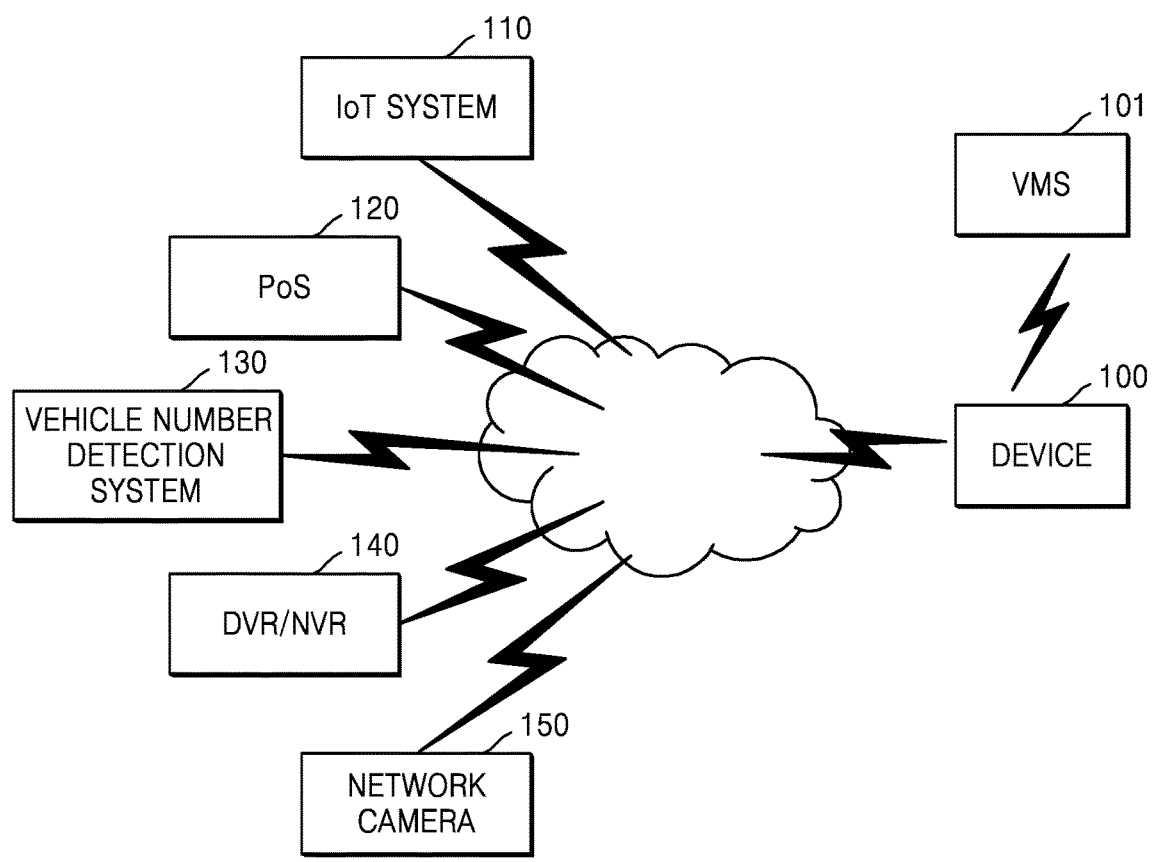
FIG. 1 illustrates a system in which a device for controlling an on-screen display (OSD) protocol is operated, according to an exemplary embodiment.

Reference will now be made in detail to exemplary embodiments, which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

A security system which uses a network camera, a storage device such as a network video recorder (NVR) or a digital video recorder (DVR), and video management software (VMS) provides a function of overlay settings. Text strings, graphics, or pictures among metadata may be overlaid onto a live video or these overlay data may be separately configured as metadata.

The open network video interface forum (ONVIF) standard provides a protocol to control OSD. The OSD protocol provided by the ONVIF includes parameter formats, parameters, and meanings thereof, as illustrated in Table 1 below.

TABLE 1

| Parameter Format | Parameter | Meaning |
| --- | --- | --- |
| VideoSourceConfigurationToken | OSDReference | Video source, Information about classification of captured images |
| OSDType | Type | Text string, Image, Other data formats |
| OSDPosConfiguration | Position | Text string start position of UpperRight, LowerLeft, LowerRight, or Custom |
| OSDTextConfiguration | TextString | Plain text, Date, Time, Type of date and time, Date and time indication format |
| OSDImgConfiguration | Image | Image path |
| OSDConfigurationExtension | Extension | Additional information |

The ONVIF standard has only provided an OSD protocol to allow a format or content of a text string or a logo image, once entered, to be kept after a device is rebooted, when the text string or logo image is to be displayed overlaid on a video image or set as separate metadata.

According to an aspect of an exemplary embodiment, in addition to the method of persistently recording and storing OSD data as described above, an OSD protocol may allow recorded data having high variability (e.g., high update frequency) or low variability (e.g., low update frequency), such as a point of sale (PoS), a vehicle number (e.g., license plate number) recognition result, a recognized person's name, or an overlaid image displayed in a specific area of a video image, to be erased after the device is rebooted, according to a setting or selection by a user. According to an aspect of an exemplary embodiment, OSD information may be implemented to be temporarily operated by adding a Boolean element called "IsPersistentText" to the parameter format "OSDConfigurationExtension" of Table 1.

When a value of the Boolean element "IsPersistentText" added to the parameter format "OSDConfigurationExtension" of an open network video interface forum (ONVIF) protocol is false, analysis data of the video image is stored to be erased after the device is rebooted. In this case, in the ONVIF, the Configuration value is a Persistent value and is implemented to retain information even when the system is rebooted. In other words, when the device is rebooted, while the Configuration value is retained as the Persistent value, the OSD data such as the analysis data of a video image, text, or a logo is implemented so as not to be retained.

ONVIF.xsd Changes

New optional attribute added to the OSDTextConfiguration.

```
<xs:complexType name="OSDTextConfiguration">
.
.
<xs:attribute name="IsPersistentText" type="xs:boolean" use="optional">
<xs:annotation>
<xs:documentation>This flag is applicable only when Type is Plain, when set to False;
PlainText Content will not be persistent across device reboots. When not specified should be considered as True. </xs:documentation>
</xs:annotation>
</xs:attribute>
```

The OSD protocol, by which information is temporarily displayed and then disappears after a specific time passes, may reduce or solve a problem of a memory defect generated as a storage device is repeatedly accessed to store an image or text when using an OSD protocol for persistently displaying information.

In particular, in the case of memory, such as NAND flash memory, which may have a limited lifespan represented by a specific number of program-erase cycles, when the memory is accessed over a certain number of times, an error may occur in the memory and thus data may not be stored any longer or stored data may be lost. Such a problem may be addressed by the OSD protocol according to an aspect of an exemplary embodiment.

FIG. 1 illustrates a system in which a device 100 for controlling an on-screen display (OSD) protocol is operated, according to an exemplary embodiment.

According to an aspect of an exemplary embodiment, the device 100 for controlling an OSD protocol may communicate in a wired or wireless manner with a security system using video management software (VMS) 101, an Internet of Things (IoT) system 110, a PoS system 120, a vehicle number detection system 130, a storage device 140 such as an NVR or a DVR, or a network camera.

The device 100 may include any device capable of playing video images. Examples of the device 100 may include computers, laptops, smartwatches, tablets, smartphones, cell phones, cameras, robots, storage devices such as NVRs or DVRs, or handheld devices. The device 100 may follow the ONVIF standard.

Figure 2:
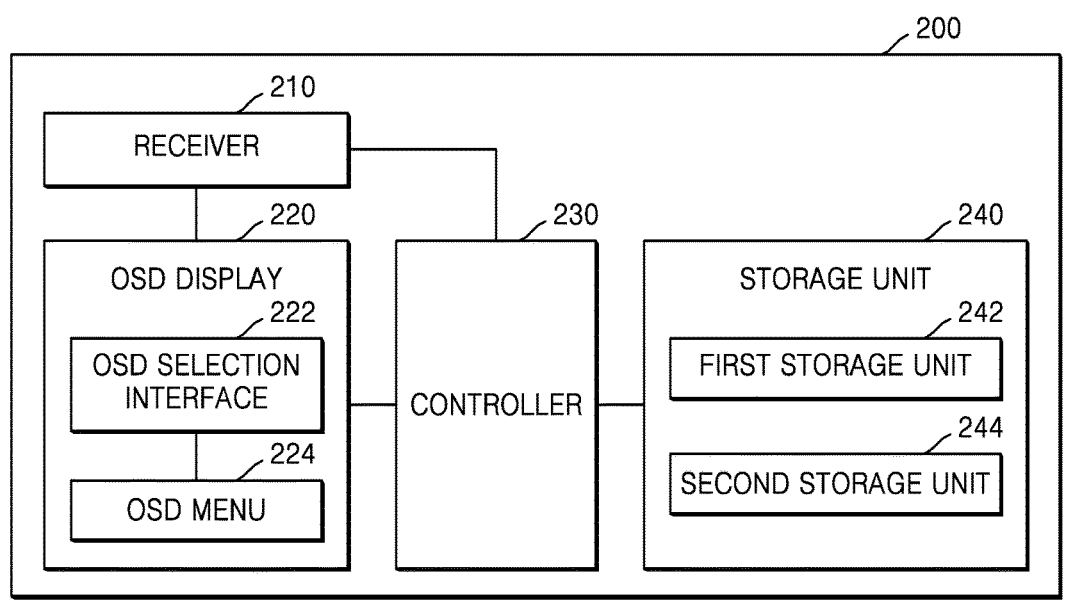
FIG. 2 is a block diagram of an internal structure of a device for controlling an OSD protocol, according to an exemplary embodiment.

FIG. 2 is a block diagram of an internal structure of a device 200 for controlling an OSD protocol, according to an exemplary embodiment.

The device 200 may include a receiver 210, an OSD display 220, a controller 230, and a storage unit 240. The OSD display 220 may include an OSD selection interface 222, such as the one illustrated in an exemplary embodiment of FIG. 3. Furthermore, the OSD display 220 may further include an OSD menu 224. The OSD menu 224 may provide a function of tabularizing items related to a name, a structure, or a function of an OSD menu, to facilitate adding, modifying, and erasing of the OSD menu by any user.

The storage unit 240 may include a first storage unit 242 and a second storage unit 244. The first storage unit 242 is implemented to store the OSD data and the analysis data of the video image received from the external device, even after the device is rebooted. In other words, the first storage unit 242 may be a persistent storage device or medium that is designed to retain any data stored therein even when power is no longer supplied to the storage device, including while and after the device reboots. The second storage unit 244 is implemented to erase, after the device is rebooted, the OSD data and the analysis data of the video image received from the external device, which are recorded before the reboot. In other words, the second storage unit 244 may be a temporary storage device or medium that may lose the stored data when power is no longer supplied to the storage device, such as when a device reboots.

An example of the first storage unit 242 may include hard disk drives (HDDs), flash memory, or NAND flash memory. An example of the second storage unit 244 may include NAND flash memory or random access memory (RAM).

The NAND flash memory may be used to store data that needs to be erased after the device is rebooted, as well as data that needs to be retained after the device is rebooted.

The device 200 for controlling an OSD protocol may be implemented so as to receive the analysis data of a video image from an apparatus capable of wired or wireless communication via the receiver 210. The analysis data of a video image may include data about face recognition in the video image; data about the number of persons counted in the video image; information about vehicle numbers (e.g., license plate numbers) recognized in the video image; information about vehicles in the video image; information about the capturing location, date, and time of the video image; information about credit cards and notes in the video image captured at a PoS; billing information; or IoT data of an object.

The OSD display 220 is implemented to display the video image and the analysis data of the video image on a display of the device 200. In this case, the analysis data of the video image may be displayed overlaid over the video image or may be separately displayed from the video image.

According to an aspect of an exemplary embodiment, when the value of the Boolean element "IsPersistentText" added to the parameter format "OSDConfigurationExtension" of the ONVIF protocol used by the device 200 is false, the controller 230 is implemented so as to store the analysis data of the video image in the second storage unit 244, in which the analysis data is to be erased after the device is rebooted.

Furthermore, when the Boolean element "IsPersistentText" added to the parameter format "OSDConfigurationExtension" of the ONVIF protocol used by the device 200 is true, the controller 230 is implemented so as to store the analysis data of the video image in the first storage unit 242, in which the analysis data is to be retained after the device is rebooted.

According to an aspect of an exemplary embodiment, the controller 230 operates the OSD selection interface 222 to classify, according to a user's selection, some data of at least one of the OSD data and the analysis data of the video image as persistent data to be stored in the first storage unit 242, and some other data as temporary data to be stored in the second storage unit 244.

According to an aspect of an exemplary embodiment, the controller 230 operates the OSD selection interface 222 to classify, according to a user's or manager's selection, all the OSD data or analysis data of the video image as persistent data to be stored in the first storage unit 242, or as temporary data to be stored in the second storage unit 244.

According to an aspect of an exemplary embodiment, the controller 230 operates the OSD selection interface 222 to classify data having high variability such as a PoS, a vehicle number recognition result, a recognized person's name, or an image displayed overlaid over a specific area of a video image as temporary data to be stored in the second storage unit 244, and other data having low variability as persistent data to be stored in the first storage unit 242.

Figure 3:
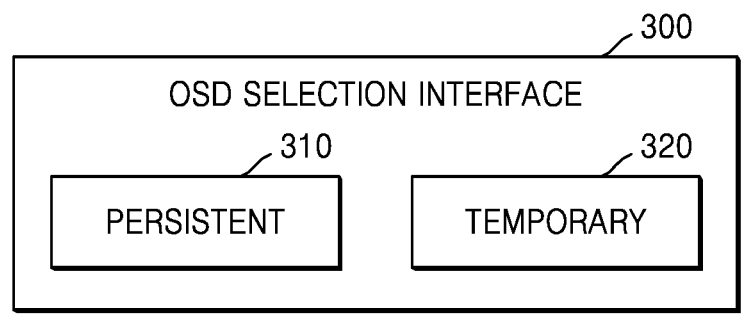
FIG. 3 is a block diagram of an OSD selection interface provided by a device for controlling an OSD protocol, according to an exemplary embodiment.

FIG. 3 is a block diagram of an OSD selection interface 300 provided to a user or manager, according to an exemplary embodiment. Even after the device is rebooted, whether to store the OSD data or the analysis data of the video image persistently or temporarily may be selected through the OSD selection interface 300.

According to an aspect of an exemplary embodiment, all the OSD data or analysis data of the video image may be set to be stored as persistent data 310 or as temporary data 320 through the OSD selection interface 300.

According to an aspect of an exemplary embodiment, according to a user's selection through the OSD selection interface 300, some data of at least one of the OSD data and the analysis data of the video image may be set to be stored as the persistent data 310, or some other data may be set to be stored as the temporary data 320.

According to an aspect of an exemplary embodiment, according to properties of data, among at least one of the OSD data and the analysis data of the video image, data having low variability may be set to be stored as the persistent data 310 and data having high variability may be set to be stored as the temporary data 320, through the OSD selection interface 300. In this case, an example of the data having low variability may include a logo image, a camera name, data, or time. The data having high variability may include user face image information detected from a video image or vehicle number information detected from a video image. High or low variability may be determined by a user or may be determined based on a threshold value. For example, if an update frequency (e.g., read/write data access per unit time) for a certain data type is greater than a predetermined threshold value, that data type may be classified as having high variability.

Figure 4:
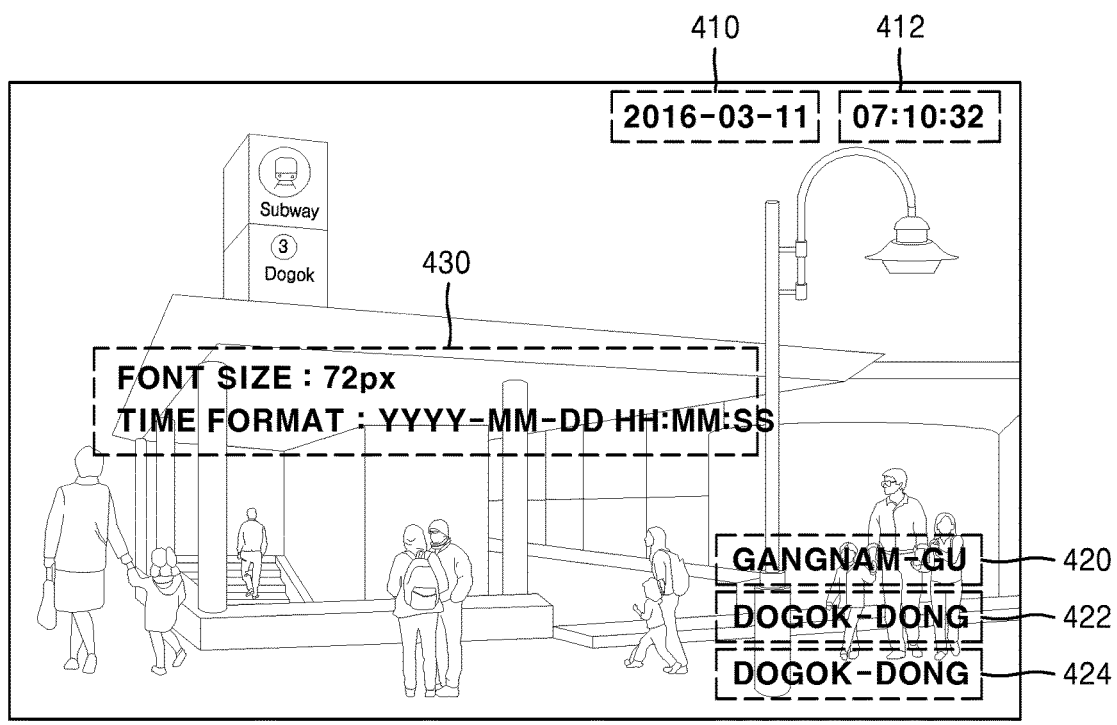
FIG. 4 illustrates an example of displaying an OSD on a captured image, according to an exemplary embodiment.

FIG. 4 illustrates an example of displaying an OSD on a captured image, according to an exemplary embodiment. In FIG. 4, a date 410, time 412, and locations 420, 422, and 424 are displayed overlaid on a captured video image, in which the OSD menu 224 of FIG. 2 is activated (430) to set the formats of the date 410 and the time 412 or a font size. The OSD data displayed on the video image or the analysis data of the video image that is externally received may be displayed according to the font size and text layout formats set through the OSD menu 224. Locations overlay 420, 422, and 424 are displayed according to text layout formats.

Figure 5:
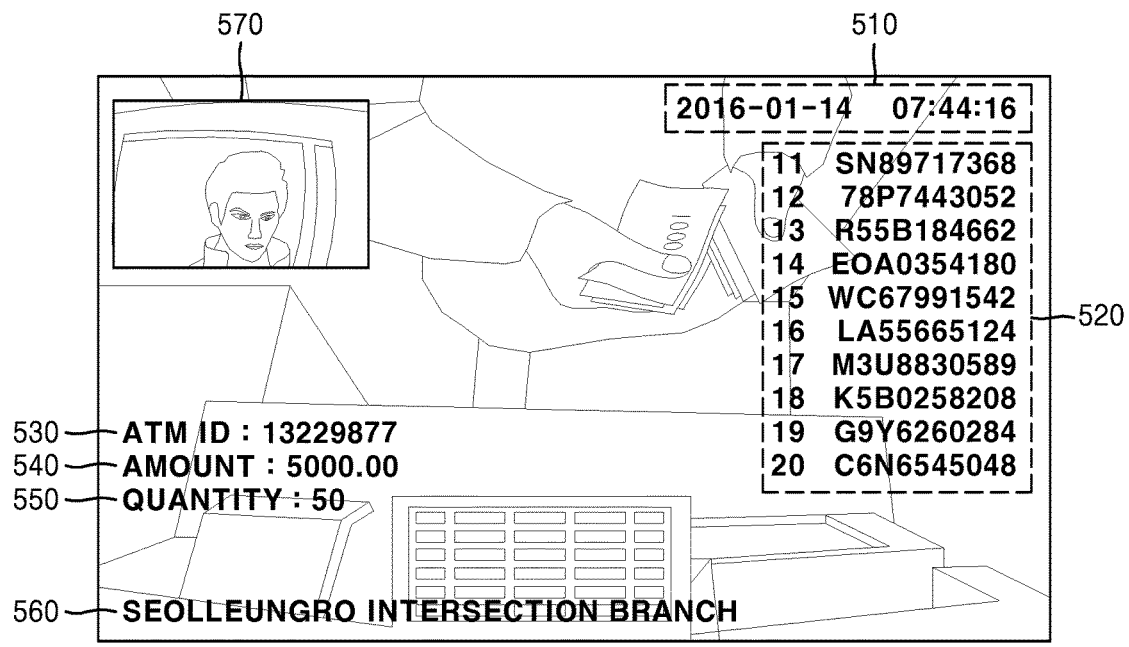
FIG. 5 illustrates an example of displaying an OSD on a captured image received from an imaging apparatus installed at a financial institution, according to an exemplary embodiment.

FIG. 5 illustrates an example of displaying an OSD on a captured image received from an imaging apparatus installed at a financial institution, according to an exemplary embodiment.

In FIG. 5, as an example of withdrawing money from an automated teller machine (ATM) installed at a financial institute, the analysis data of the video image is displayed on a video image received from a security camera installed at the ATM. The analysis data of the video image may include date and time 510, numbers of checks to be withdrawn 520, an ATM identification number 530, an amount 540, a quantity of checks 550, a location 560, and an image 570 of a face of a user withdrawing the checks.

Information such as the date and time 510, the ATM identification number 530, or the location 560 among the analysis data of the video image in the embodiment of FIG. 5 may be classified as data having low variability, and may be recorded in a storage medium such as an HDD so as to be retained after the device is rebooted. Furthermore, information such as the numbers of the checks to be withdrawn 520, the amount 540, the quantity of checks 550, or the image 570 of a face of a user withdrawing a check may be classified as data having high variability, and may be recorded in a storage medium such as RAM so as to be erased in case of a device reboot. Whether data is classified as having high variability or low variability may be set by a user, or may be classified through machine learning.

Figure 6:
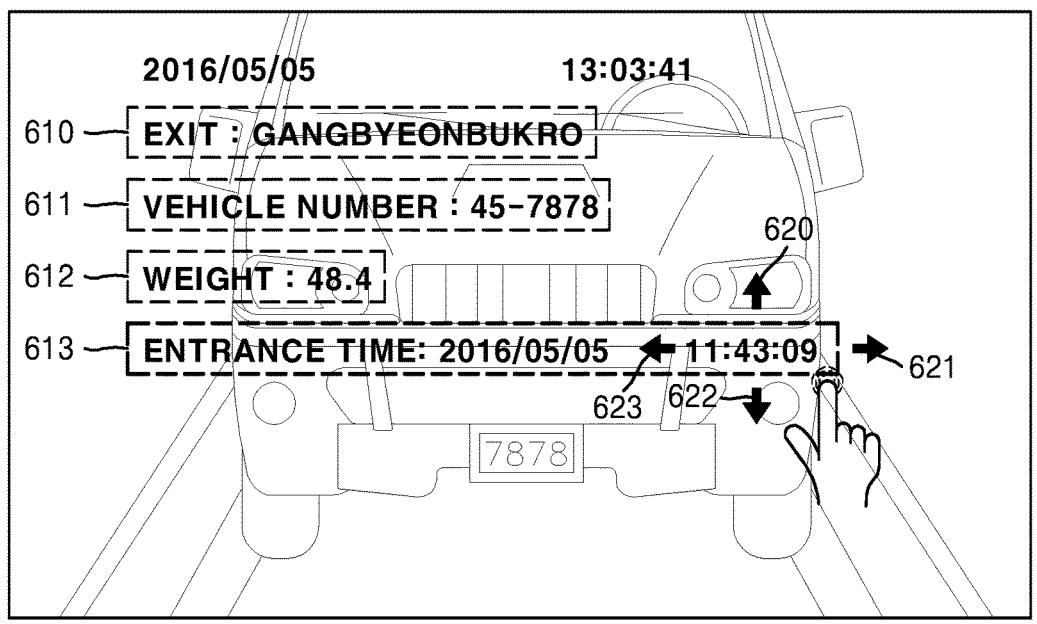
FIG. 6 illustrates an example of displaying an OSD on an image captured at a tollgate, according to an exemplary embodiment.

FIG. 6 illustrates an example of displaying an OSD on an image captured at a tollgate, according to an exemplary embodiment. In FIG. 6, a vehicle is displayed in a video image, and information such as date, time, a location 610, a vehicle number (e.g., license plate number) 611, a weight 612, or an entrance time 613 are displayed on the video image.

A user may record part or all of the analysis data of the video image in a storage medium such as RAM, in which the analysis data is to be erased in case of a device reboot. Furthermore, a position where the part of the analysis data of the video image is displayed may be set on the video image by using arrows 620, 621, 622, and 623. In this case, a position where the analysis data of the video image is to be displayed overlaid on the video image may be set through an interface of touching a touch screen.

Figure 7A:
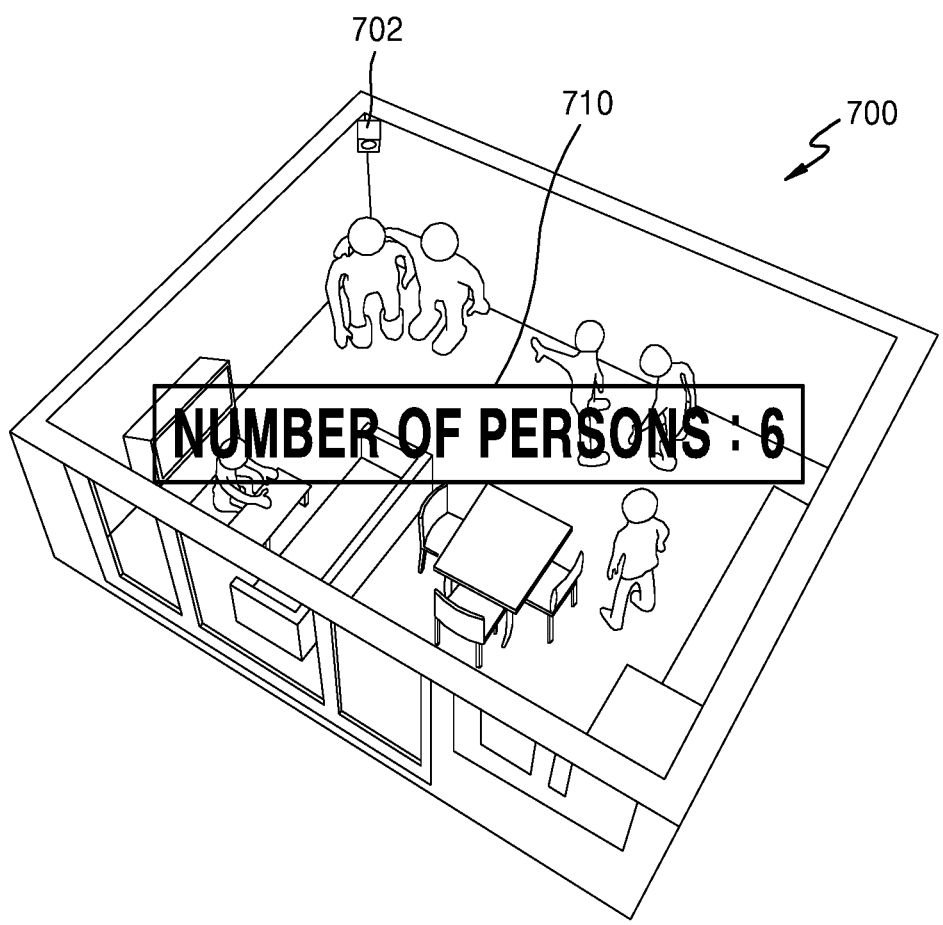
FIGS. 7A and 7B illustrate examples of displaying, on an OSD, information about the number of persons detected in a captured image, according to an exemplary embodiment.
Figure 7B:
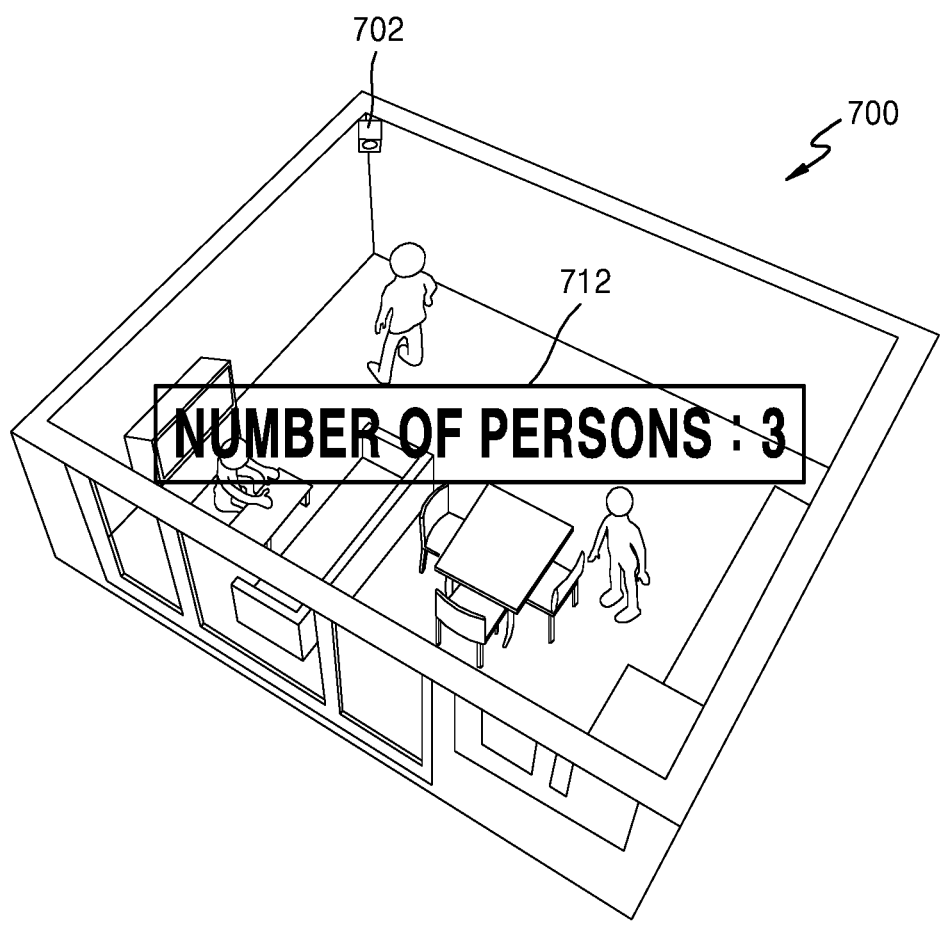

FIGS. 7A and 7B illustrate examples of displaying, on an OSD, information about the number of persons detected in a captured image, according to an exemplary embodiment.

The device may display both of a video image received from a video image capturing device 702 for capturing an image of a specific area and analysis data of the received video image (700). FIG. 7A illustrates an example of receiving the number of persons in the received video image as the analysis data of the video image. Referring to FIG. 7A, in the device, "Number of persons: 6" 710, which is analysis data of the video image, is displayed overlaid on the video image. In this case, "Number of persons: 6", which is analysis data of the video image that varies in real time, may be classified as temporary data and recorded in RAM. Alternatively, when the information about the number of persons is to be permanently stored in real time, the information may be classified as persistent data and may be stored in a preset storage medium such as HDD or NAND flash memory.

FIG. 7B illustrates "Number of persons: 3" 712, which is analysis data of the video image, as being displayed overlaid on the video image. When the recognized number of detected persons is noteworthy, an alarm may be transmitted to a manager when the number of persons exceeds a preset value or falls below a preset value.

Figure 8:
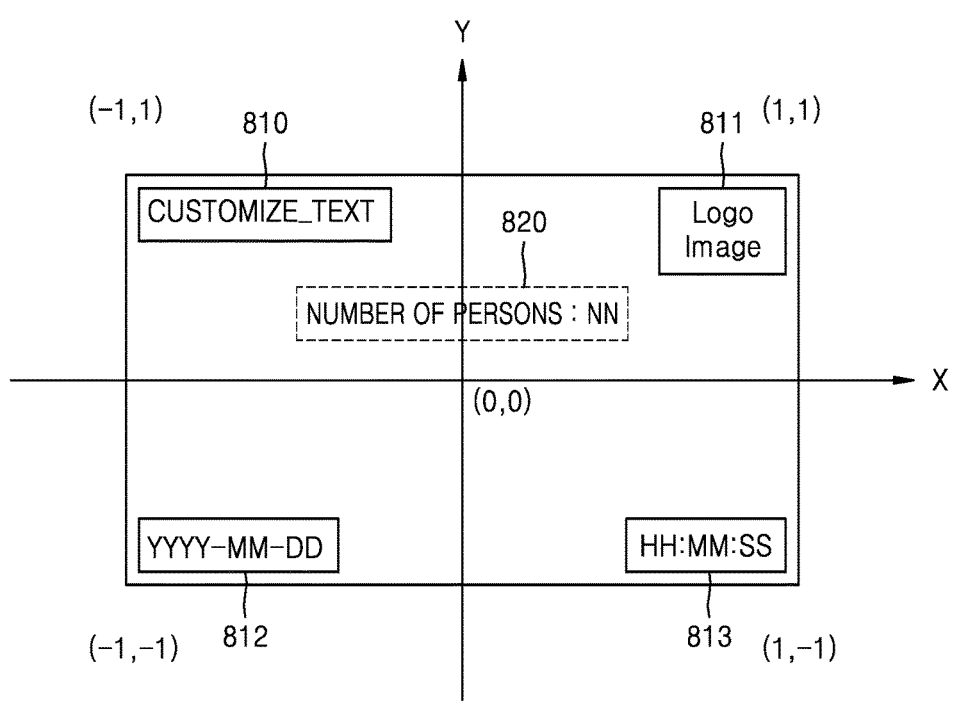
FIG. 8 illustrates an example of a standardized coordinate system for displaying an OSD on a captured image, according to an exemplary embodiment.

FIG. 8 illustrates an example of a standardized coordinate system for displaying an OSD on a captured image, according to an exemplary embodiment. In an ONVIF standard, a standardized coordinate system as shown in FIG. 8 is used to display an OSD.

When at least one of the analysis data of the video image is displayed overlaid on the video image, the standardized coordinate system as shown in FIG. 8 may be used.

Furthermore, analysis data of the video image, which is recorded so as to be retained after the device is rebooted, is displayed at preset positions 810, 811, 812, and 813, and analysis data 820 of the analysis data of the video image, which is recorded so as to be erased in case of a device reboot, is displayed in a manner that a user may select a position to display the analysis data of the video image in the video image. The user may display the analysis data of the video image at a desired position by using a touch-type interface or a drag-and-drop-type interface.

Figure 9:
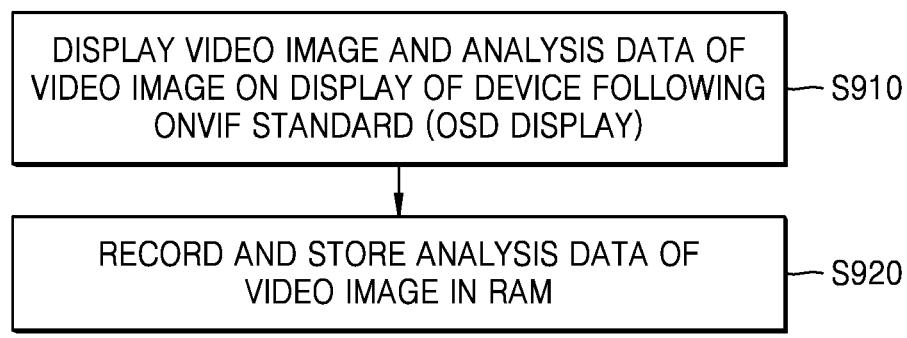
FIGS. 9 to 10 are flowcharts of methods of controlling an OSD protocol in a device, according to an exemplary embodiment.
Figure 10:
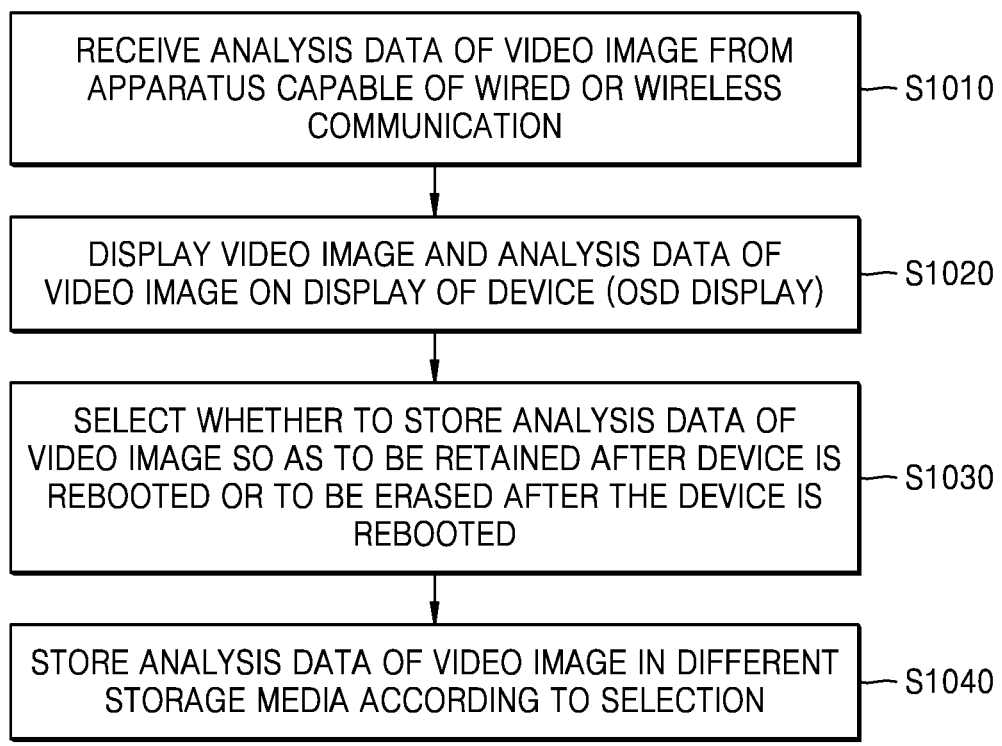

FIGS. 9 to 10 are flowcharts of methods of controlling an OSD protocol in a device, according to exemplary embodiments. The operations outlined herein are exemplary and can be implemented in any combination thereof, including combinations that exclude, add, or modify certain operations.

FIG. 9 is a flowchart of a method of controlling an OSD protocol in a device, according to an exemplary embodiment.

The method may include displaying a video image and the analysis data of the video image on a display of a device following the ONVIF standard (S910), and recording and storing the analysis data of the video image in RAM (S920).

FIG. 10 illustrates a method of controlling an OSD protocol in a device, according to another exemplary embodiment.

The device receives analysis data of the video image from an apparatus capable of wired or wireless communication (S1010). A video image and the analysis data of the video image are displayed on a display of the device (S1020). In this case, the analysis data of the video image may be displayed overlaid on the video image or may be displayed at a separate position.

By providing a user with an interface (S1030), a controller of the device controls selection of whether to record the analysis data of the video image so as to be retained after the device is rebooted or to be erased after the device is rebooted.

The analysis data of the video image is classified as data to be retained after the device is rebooted or as data to be erased after the device is rebooted, according to a user's selection, and then the respective data are stored in different storage media (S1040).

The various exemplary embodiments may be implemented as computer-readable code or instructions stored on a computer-readable recording medium. The computer-readable recording medium is any data storage device that can store data which can thereafter be read by a computer system. Examples of the computer-readable recording medium include read-only memory (ROM), random access memory (RAM), compact disc ROMs (CD-ROMs), magnetic tapes, floppy disks, optical data storage devices, etc. The computer-readable recording medium may also be distributed over network-coupled computer systems so that the computer-readable code is stored and executed in a distributive manner.

As described above, in an exemplary embodiment, since a device for controlling an OSD protocol is provided, OSD data may be temporarily stored.

In an exemplary embodiment, since the device selectively classifies data having high variability as temporary OSD data and data having low variability as persistent OSD data, and stores the respective data in different storage devices, the OSD data may be used regardless of the number of times memory is accessed.

The OSD protocol, according to an aspect of an exemplary embodiment, that allows data displayed as temporary data to disappear after a specific time passes may solve a memory defect problem that occurs as the storage device is repeatedly accessed to continuously store an image or text when an OSD protocol for persistently displaying data is used.

Since a method of managing OSD data that varies in real time is provided, OSD data may be used with high-frequency access in a financial institute or a PoS.

Since a method of managing OSD data that varies in real time is provided, data may be displayed on a video image by using IoT data.

Since a method of managing OSD data that varies in real time is provided, a network camera or a security camera may detect and manage the number of persons.

It should be understood that exemplary embodiments described herein should be considered in a descriptive sense only and not for purposes of limitation. Descriptions of features or aspects within each embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of controlling an on-screen display (OSD) protocol in a device, the method comprising,
   receiving analysis data of a video image from an apparatus capable of at least one of wired and wireless communication;
   displaying the video image and the analysis data of the video image on a display of the device;
   determining whether to record the analysis data of the video image in a persistent storage device to be retained after the device reboots or in a temporary storage device to be erased after the device reboots based on a value of a Boolean element "IsPersistentText" added to a parameter format of an open network video interface forum (ONVIF) protocol implemented by the device being true or false; and
   storing the analysis data of the video image in one of the persistent storage device and the temporary storage device according to the determination,
   wherein the displaying the video image and the analysis data comprises displaying the analysis data overlaid on the video image,
   wherein, when the analysis data is displayed overlaid on the video image, a user is provided with an interface to select a position of the displayed analysis data with respect to the video image,
   wherein the analysis data comprises image and text, which continuously changes in real time,
   wherein the analysis data of the video image comprises date and time, numbers of checks to be withdrawn, an ATM identification number, an amount, a quantity of the checks, a location, and an image of a face of a user withdrawing the checks,
   wherein the date and the time, the ATM identification number, and the location are classified as data having a first variability based on machine learning,
   wherein the numbers of the checks to be withdrawn, the amount, the quantity of the checks and the face of the user withdrawing the checks are classified as data having a second variability based on the machine learning, the second variability being higher than the first variability, and
   wherein the data having the first variability are recorded in the persistent storage device, and the data having the second variability are recorded in the temporary storage device.

2. The method of claim 1, wherein the temporary storage device comprises a random access memory (RAM).

3. The method of claim 1, wherein the persistent storage device comprises at least one of a flash memory, a hard disk drive, and a NAND memory.

4. The method of claim 1, wherein the analysis data of the video image comprises at least one of:
   data about a number of persons counted in the video image;

information about a vehicle number recognized in the video image;
information about a vehicle in the video image;
information about a location, a date, and a time of capturing the video image;
information about one of a credit card and a note in the video image captured at a point of sale (PoS);
billing information; and
Internet of things (IoT) data of an object.

5. The method of claim 1, wherein, when at least one portion of the analysis data is displayed overlaid on the video image, the user is provided with an interface to select a position of each of the at least one portion of the analysis data with respect to the video image.

6. The method of claim 1, wherein, when at least one portion of the analysis data is displayed overlaid on the video image, a first portion of the analysis data that is recorded in the persistent storage device is displayed at a predetermined position, and a second portion of the analysis data that is recorded in the temporary storage device is displayed at a position selected by a user by using an interface to select the position of the second portion of the analysis data with respect to the video image.

7. The method of claim 1, wherein the displaying the video image and the analysis data comprises displaying the analysis data as one of an image and text.

8. The method of claim 1, further comprising, in response to the analysis data of the video image relating to a number of persons counted in the video image, transmitting an alarm message when the number of persons counted in the video image exceeds a threshold value.

9. The method of claim 1, wherein the analysis data of the video image is received from an external apparatus capable of one of wired and wireless communication.

10. The method of claim 1, wherein the determining is performed based on a user input.

11. The method of claim 1, wherein the determining further comprises determining to record a first portion of the analysis data of the video image in the persistent storage device, and to record a second portion of the analysis data of the video image in the temporary storage device; and
wherein the storing further comprises storing the first portion of the analysis data of the video image in the persistent storage device and the second portion of the analysis data of the video image in the temporary storage device.

* * * * *